United States Patent

[11] 3,614,428

[72] Inventors Bernard Miller
Pittsburgh;
Joseph C. McCloskey, Glenshaw, both of Pa.
[21] Appl. No. 762,771
[22] Filed Sept. 26, 1968
[45] Patented Oct. 19, 1971
[73] Assignee Westinghouse Electric Corporation
Pittsburgh, Pa.

[54] X-RAY APPARATUS HAVING MEANS FOR DIRECTING AN IMAGE TO EITHER OF TWO DIFFERENT CAMERAS
4 Claims, 4 Drawing Figs.
[52] U.S. Cl. .................................................... 250/65,
178/6.8, 250/71, 250/77
[51] Int. Cl. ....................................................... G03b 41/16
[50] Field of Search .......................................... 350/55, 68;
250/65, 71, 77; 178/6.8

[56] References Cited
UNITED STATES PATENTS
| | | | |
|---|---|---|---|
| 3,291,985 | 12/1966 | Graves et al. .................. | 250/77 |
| 3,359,418 | 12/1967 | Bahr et al. ..................... | 250/49.5 (1) |
| 3,439,114 | 4/1969 | Taylor et al. ................... | 250/65 X |

*Primary Examiner*—James W. Lawrence
*Assistant Examiner*—A. L. Birch
*Attorneys*—F. H. Henson, E. P. Klipfel and D. F. Straitiff ABSTRACT: X-ray apparatus in which the amplified luminous image from the output screen of an image amplifier tube may be directed selectively to either of two different film camera locations while constantly being observable by a television camera. A rectangular housing has oppositely aligned lens-barrel-accepting openings in its top and bottom walls for television camera and image tube, respectively, and in its sidewalls for two different film cameras. A pair of normally retracted partial mirrors mounted in 45° titled attitudes are actuated horizontally about vertical axes by respective solenoids into sideward-reflecting positions near lens barrels in the wall openings.

X-RAY APPARATUS HAVING MEANS FOR DIRECTING AN IMAGE TO EITHER OF TWO DIFFERENT CAMERAS

BACKGROUND OF THE INVENTION

1. Field of the Invention

X-ray apparatus with television and film camera observation of the output screen of an image amplifier tube.

2. Description of The Prior Art

Amplified-image X-ray apparatus with operator-controlled power-actuated partial mirror devices for observation mode selection have been relatively slow acting and cumbersome with respect to effecting a change in mode as accommodated by such partial mirror devices.

SUMMARY OF THE INVENTION

The present invention, by virtue of provision of a partial mirror device that employs solenoid actuation of the partial mirror means affords rapid effectuation of observation mode selection. By virtue of provision of two partial mirrors within such device to divert the amplified image to either side, two different film cameras may be selected from for image recording in addition to observation by way of a television camera atop such device. By virtue of the pivotal mounting of the partial mirrors near their one edge in a tilted attitude for horizontal swinging movement to and from their effective positions, such mirrors are brought into close proximity to the ends of the objective lens barrels of the cameras and image tube which project into the device, thereby affording a high degree of optical efficiency and minimal space demand for such device.

DESCRIPTION OF THE PREFERRED EMBODIMENT

Figure 1:
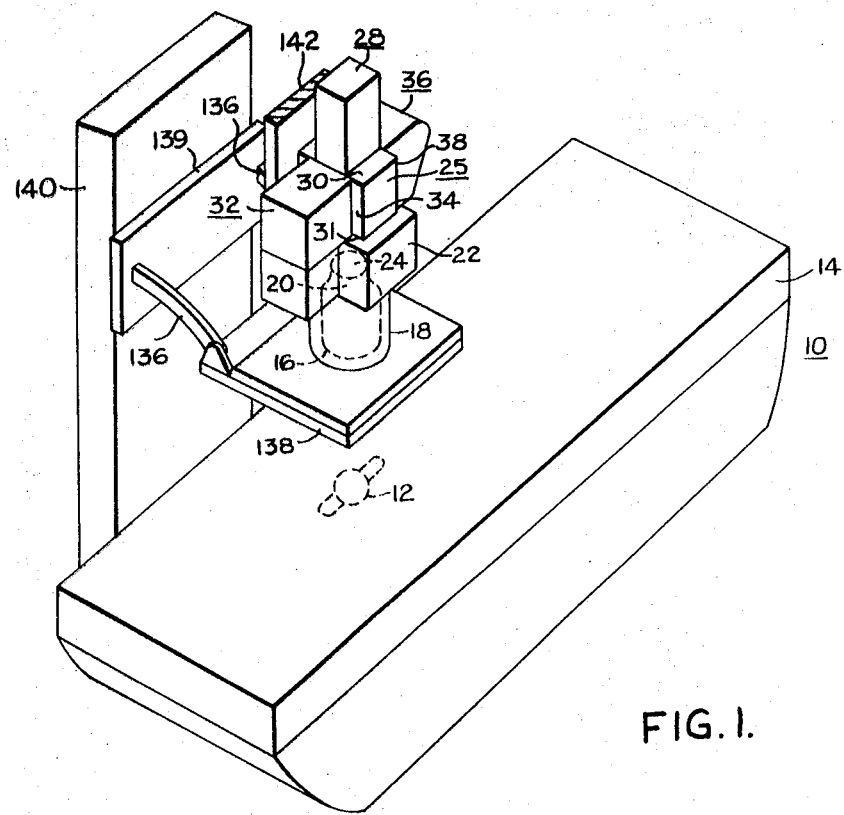
FIG. 1 is an outline view in perspective showing an amplified-image X-ray examination apparatus embodying the invention.

Referring to FIG. 1 in the drawings, the usual X-ray examination apparatus in which the invention is embodied will comprise an X-ray table 10 in the interior which is mounted an X-ray tube 12 for generating X-rays directed perpendicularly through the table top 14 for X-ray examination of a patient (not shown) supported on said top. An image amplifier tube 16 of well-known construction, disposed partly in a cylindrical housing 18 and having a neck portion 20 projecting upwardly through a rectangular control housing 22, has an output screen 24 at the uppermost projecting end thereof as viewed in FIG. 1 to serve the well-known function of providing electronic intensification of a fluorescent image produced on the input screen at the lower end of such image amplifier tube, at such output screen.

The novel partial mirror device 25 of the present invention embodied in this apparatus has a rectangular housing 26 mounted on top of the rectangular control housing 22 through which the upper necked-down output screen portion 20 of the image amplifier tube 16 extends. The partial mirror device 25 in turn has a television camera 28 mounted on its upper wall 30 for observation of the output screen 24 of the image amplifier tube via the bottom wall 31 of the device 25, a spot film camera 32 mounted on one sidewall 34, and a cine camera 36 mounted on its other sidewall 38. By selective operation of the partial mirror device 25, the luminous image from the output screen 24 of the image amplifier tube 16 may be diverted from one side to the other of the device to one or the other of the two cameras while simultaneously being observed by the television camera 28, to suit the desires of the physician or technician operating the equipment.

Figure 2:
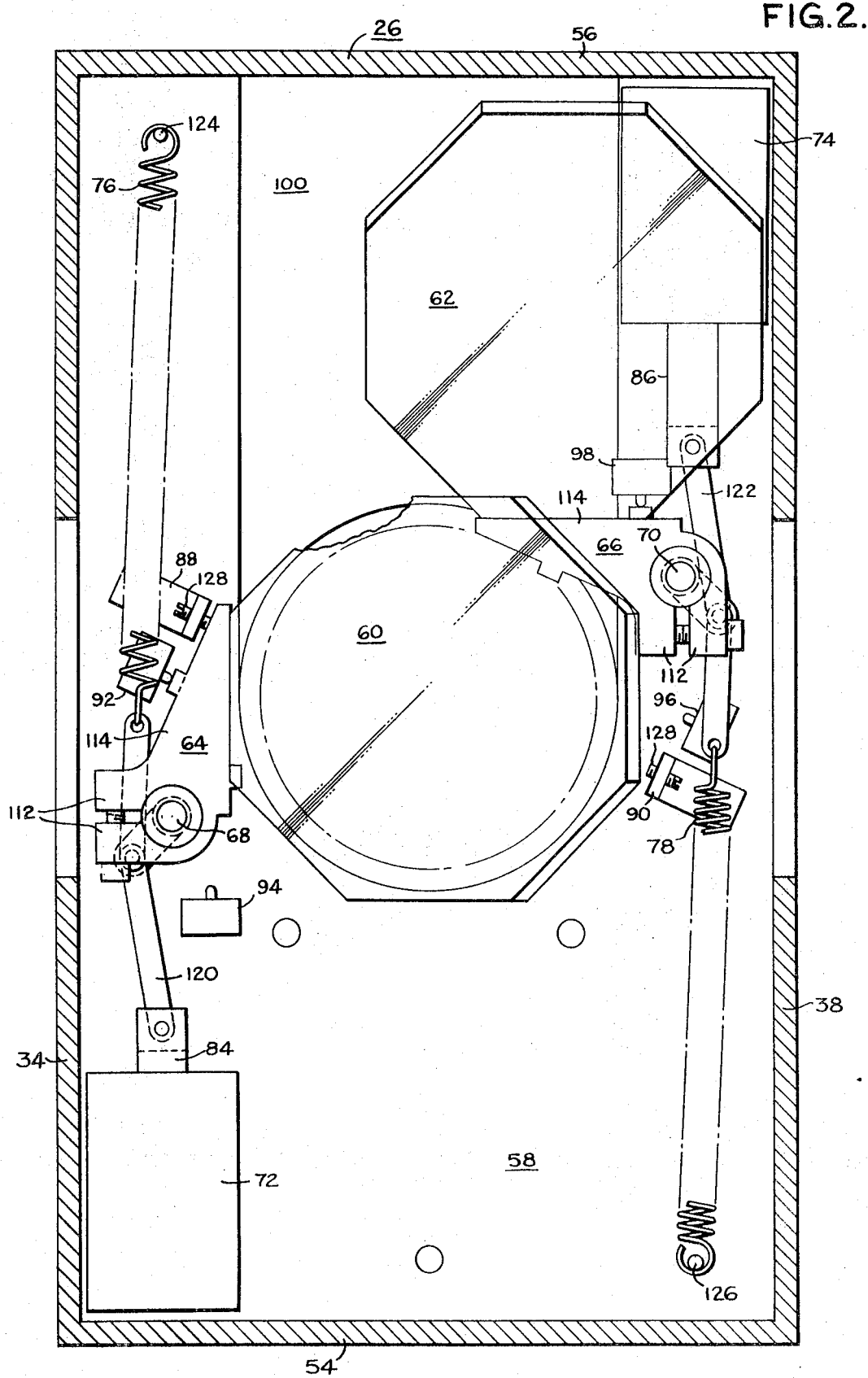
FIG. 2 is a section view taken along the line II—II in FIG. 1 showing construction details of a novel partial mirror device embodied in the apparatus of FIG. 1.
Figure 3:
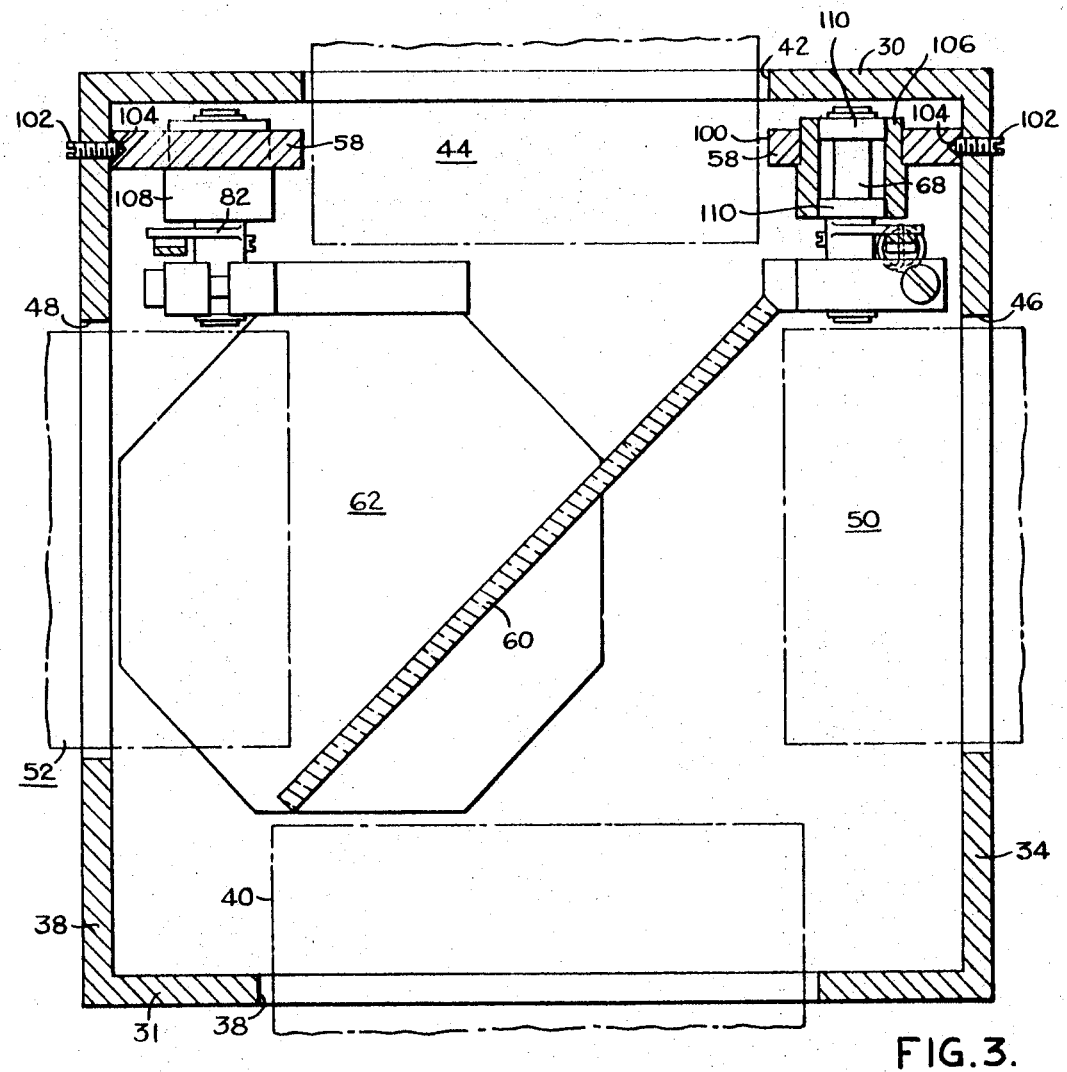
FIG. 3 is a vertical section view of the novel partial mirror device taken along the line III—III in FIG. 2.

Referring to FIGS. 2 and 3, in the drawings, the partial mirror device 25 embodied in the apparatus of the present invention comprises the aforementioned rectangular housing 26 having top 30, bottom 31 and sidewalls 34, 38. At the center of the bottom wall 31, there is a circular opening 38 to accommodate projection of the end of an objective lens barrel 40 for the output screen of the image amplifier tube. At the center of the top wall 30 there is a circular opening 42 for accommodation of downward projection of the objective lens barrel 44 of the television camera, the openings 42 and 38 in the top and bottom walls 30 and 31 being coaxially aligned. At the center of the two sidewalls 34 and 38 there are coaxially aligned openings 46 and 48 for accommodating the projecting ends of lens barrels 50 and 52 for two film cameras, such as the spot film camera 32 and the cine camera 36 exemplified in FIG. 1. The front wall 54 and/or backwall 56 of the housing 26 are removable for access to a removable partial mirror assemblage disposed within such housing, without necessarily disturbing the position of the housing as mounted atop housing 22 or the positions of the several cameras 28, 32, 36 which may be mounted on the exterior of such housing 26.

The partial mirror assemblage disposed within the housing comprises a flat mounting plate 58 or base member which carries two partial mirrors 60, 62, mounting members 64, 66 for the two partial mirrors, a pair of shafts 68, 70 for rotary support of the mirror mounting members, a pair of solenoids 72, 74 for actuating the mirror-mounting members, and a pair of helical elongated return springs 76, 78 for actuating the mirror mounting members to retracted positions. Also included in general are: respective crank arms 80, 82 for coupling the respective armatures 84, 86 of the solenoids 50, 52 to the mirror mounting members 64, 66; a pair of adjustable stops 88, 90 to define the active positions of the partial mirrors, and several microswitches 92, 94 and 96, 98 affiliated with each mirror mounting member 64, 66 as components of the control circuit of FIG. 4 to be described hereinafter.

The length of the mounting plates 58 is substantially equal to that of the interior of the rectangular housing 26 as is the width of such mounting plate slightly less than the width of the interior of such housing, so that one end of the mounting plate may be inserted edgewise into the interior of the housing while one or the other of the front and back walls 54, 56 is removed. The mounting plate 58 is open at its center to provide for in-line exposure of the objective lens barrel 44 of the television camera 28 to the objective lens barrel 40 of the image amplifier tube 16 when the mounting plate is disposed within the housing adjacent and parallel to the top wall 30, for example, of such housing. A slot 100 is also provided in the mounting plate 58 which opens from one of its narrower edges into juncture with the central opening in such plate to enable the plate to be slid past the inwardly projecting portion of the television camera objective lens barrel 44 without requiring removal of such barrel together with the television camera 28 affiliated with same. The mounting plate 58 might as readily be disposed adjacent to the bottom wall 31 of the rectangular housing, but typically the objective lens barrel 40 for the image amplifier tube 16 usually is of somewhat larger diameter than the lens barrel 44 of the television camera 28, so that the slot 100 in the mounting plate would need to be wider in such bottom-mounted position, which in turn might necessitate a wider mounting plate and an increase in the width of the housing 26 in general. The mounting plate 58 is removably and adjustably secured in the housing 26 as by means of tapered machine screws 102 in screw-threaded engagement with the sidewalls 34, 38 of the housing in cooperation with the V-shaped grooves along the side edges of such mounting plate; or by any other suitable means.

Each of the two partial mirrors 60, 62 is coated to have any suitable transmission-to-reflection ratio, such as 85/15 or 50/50, for example, and its face is generally elliptical in shape, such as the eight-sided configuration illustrated in the drawings, and is carried by a respective one of the mirror mounting members 64, 66 in a 45° tilted attitude, with respect to the two mutually perpendicular optical axes in the vertical and horizontal as viewed in the drawing. The mirrors are secured to the mounting members 64, 66 as by epoxy bonding. As assembled as shown in FIG. 3, where the mounting plate 58 is disposed near the top of the housing 26, the mounting members 64, 66 are disposed beneath the undersurface of the mounting plate 58 and are carried on the lower ends of the vertically extending shafts 68, 70 which are rotatably supported within respective vertical sleeves 106, 108 secured in respective openings in the mounting member 58. Axially spaced-apart roller bearings 110 disposed within each of the sleeve members 106, 108 provide for friction-free rotary support of the respective shaft 68, 70. When assembled as shown in FIG. 3, with the mounting plate 58 disposed near the top of the housing 26, the partial mirrors 60 and 62 extend downwardly at a 45° angle within such housing and have a generally circular configuration as projected in horizontal and vertical directions, as can be noted in FIG. 2. The shafts 68 and 70 are located along side edges of the mounting plate 58 and are offset longitudinally of such plate with respect to the vertical centerline of the housing. The mounting members 64, 66 in addition to having a split-sleeve portion 112 for clamped attachment around the end of the respective shaft 68, 70 have an elongated cantilever portion 114 projecting therefrom to which the mounting edge of the mirror is secured. By virtue of this arrangement, the location of the pivot point for turning movement of the mirror 60, 62 at the shaft 68, 70 is also therefore offset with respect to the center of the mirror and enables the mirror to occupy a retracted position disposed out of registry with the central viewing port in member 58 with minimal side clearance requirements within the housing 26.

Disposed between the ends of the sleeves 106 and 108 and the mounting members 64, 66 are respective crank arms 116, 118 secured, as by setscrews, to the shafts 68, 70, and hence to the mounting members. One end of a respective connecting rod 120, 122 is pivotally connected to the respective crank arm 80, 82 and at its opposite end is pivotally connected to the end of the respective solenoid armature 84, 86. In the retracted position of the mirror 60, 62, the crank arm 80, 82 withdraws the armature or plunger rod of the respective solenoid 72, 74 to an extended position. In energization, the solenoid 72, 74 retracts its armature, and through the medium of the connecting rod 120, 122, turns the crank arm 80, 82, hence the shaft 68, 70, mirror mounting member 64, 66, and mirror 60, 62 about the axis of such shaft to cause the mirror 60, 62 to come into registry with the observation opening 38, or in other words, to assume its effective position in which mirror 60 is shown in FIG. 2. Retraction of the mirror 60, 62 to the response position, in which mirror 62 is shown in FIG. 2, is performed by the elongated helical tension springs 76 and 78, respectively, which are anchored at one end to posts 124 and 126 secured to mounting plate 58 and at the opposite ends to portions of the crank arms 80 and 82. The respective active or effective positions of the partial mirrors 60 and 62 are defined by the respective adjustable stop members 88 and 90 affixed to the mounting plate 58, and which edges of the mirror mounting arms 114 of the mounting members 64 and 66 abut during actuation by the solenoids 72 and 74. The stop members 88 and 90 may be as illustrated in the form of a pedestal carrying an adjustable stop screw 128 for such abutment with a mounting member. Actuation of the mirrors 60 and 62 from their retracted positions to their active positions can be effected rapidly by the solenoids 72 and 74 within a fraction of a second following energization of such solenoids, so that selection of the operating mode for the apparatus will enjoy substantially instantaneous response to the dictates of an operator. Action of the return springs 76 and 78 to retract the mirrors 60 and 62 also is fast acting and also can transpire in a fraction of a second, so that even switching from one mirror to the other can be made to take place rapidly.

Figure 4:
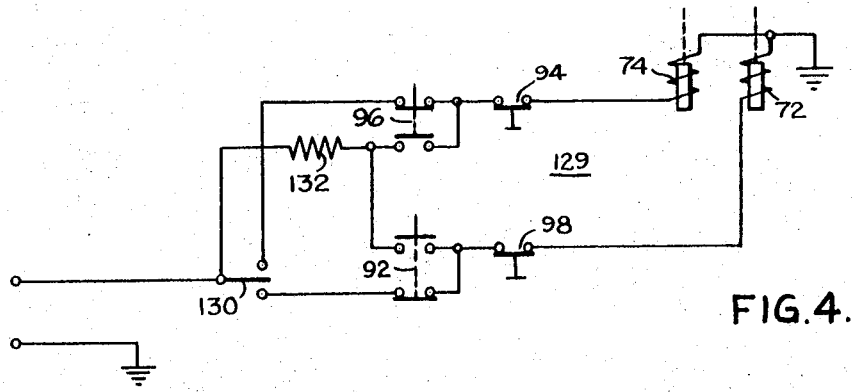
FIG. 4 is a diagram of an electrical circuit employed for controlling operation of the aforesaid partial mirror device.

Referring primarily to FIG. 4, the control circuit 129 for actuation of the partial mirrors 60 and 62 includes selector switch means 130 for effecting selective energization of the two mirror actuating solenoids 72 and 74, and the respective microswitches 92 and 98 affiliated with the two mirror assemblages are arranged in the circuit to prevent energization of a particular solenoid until the other mirror occupies its fully retracted position. At the same time, to permit the return spring 76, 78 to be of sufficient force to effect rapid retraction of the mirror 60, 62, while at the same time providing for sufficient energization of the solenoids 72, 74 to also effect rapid actuation of the mirror to its effective position against the opposition of such return spring, the control circuit provides for full current supply to the solenoids 72, 74 during actuation of the mirror and reduced current to such solenoid for holding same in such active position upon attainment thereof. This feature is afforded by virtue of arrangement of the microswitches 94 and 96 operated by the mounting members 64 and 66, for example, which provide for disrupting the initial energizing circuit to the solenoids 72 and 74 and cutting in a current-reducing resistor 132, upon actuation of either of the microswitches 94 and 96 by the mirror mounting members 64 and 66 when a respective partial mirror obtains its active position.

Referring again to FIG. 1, the assemblage including housings 18, 22 and 26 and cameras 28, 32 and 36 is so affiliated with the examination table 10 as to maintain the image amplifier tube 16 aligned with the X-ray tube 12 within the table body while permitting adjustment of tube 16 toward and away from the table top 14, by virtue of removable attachment to a mounting member 134 at the lower end of the cylindrical image tube housing, which is held parallel to the table top surface via bracket arms 136 carried by a vertical carriage 138 on a spotfilm tower 140 movable along the table in coincidence with X-ray tube movement, in the well-known manner. Primary support for the aforesaid assemblage may be obtained via such as a member 142 pivotally connected thereto which affords tilting of the assemblage about a horizontal axis in coincidence with tilting of the table. Member 142 in turn will find support from well-known overhead framework and carriages (not shown) via such as a cable-and-pulley system (not shown) including counterbalance means and possibly an extendable column. In certain types of installations, the spotfilm tower 140, etc. are omitted and alignment of the image assemblage with an X-ray tube will be effected otherwise.

What is claimed is:

1. X-ray apparatus comprising,
   a housing having top and bottom walls with vertically aligned lens-barrel-accommodating openings therein and side walls with horizontally aligned lens-barrel-accommodating openings therein,
   a pair of partial mirrors having normally retracted positions disposed out of registry with the lens-barrel-accommodating openings,
   mirror mounting means including a pair of vertical shafts at opposite sides of the vertically aligned openings constantly supporting said partial mirrors in oppositely facing 45° tilted attitudes relative to alignment of the openings for pivotal movement horizontally into active positions in registry with both the vertically and horizontally aligned lens-barrel-accommodating openings,
   adjustable stop means affixed to said housing and cooperable with said mounting means to define the active positions for the partial mirrors,
   spring means biasing said mirrors toward their retracted positions, and
   a pair of solenoids operatively connected to said mounting means, respectively, operable selectively for actuation of one or the other of said mirrors to its active position.

2. The X-ray apparatus of claim 1, further comprising an energization control circuit for said solenoids which includes interlock switch means operable by said mirror mounting means to prevent energization of one solenoid unless the mirror affiliated with the other solenoid occupies its retracted position.

3. The X-ray apparatus of claim 2, wherein said energization control circuit further includes switch means operable by said mirror mounting means to reduce the current supplied to a particular solenoid when the mirror actuated by such solenoid attains its active position.

4. The X-ray apparatus of claim 1, further including an image amplifier tube having an objective lens barrel thereof projecting into the lens-barrel-accommodating opening in the bottom wall of said housing, a television camera having an objective lens barrel projecting into the lens-barrel-accommodating opening in the top wall of said housing, and two different film cameras having respective objective lens barrels projecting into the lens-barrel-accommodating openings in the sidewalls of said housing.